(12) United States Patent
Hofer et al.

(10) Patent No.: US 7,505,798 B2
(45) Date of Patent: Mar. 17, 2009

(54) ANGULAR KEYBOARD FOR A HANDHELD MOBILE COMMUNICATION DEVICE

(75) Inventors: Joseph Hofer, Kitchener (CA); Roman P. Rak, Waterloo (CA); Jason T. Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 460 days.

(21) Appl. No.: 11/422,935

(22) Filed: Jun. 8, 2006

(65) Prior Publication Data

US 2007/0287391 A1    Dec. 13, 2007

(51) Int. Cl.
  *H04M 1/00*    (2006.01)
(52) U.S. Cl. ............... 455/575.1; 455/90.3; 455/556.2; 345/169; 400/472
(58) Field of Classification Search ............. 455/575.1, 455/90.3, 556.2; 345/169; 400/472
  See application file for complete search history.

(56) References Cited

U.S. PATENT DOCUMENTS

| | | | |
|---|---|---|---|
| 6,396,482 B1 * | 5/2002 | Griffin et al. | 345/169 |
| 6,452,588 B2 * | 9/2002 | Griffin et al. | 345/169 |
| 6,489,950 B1 * | 12/2002 | Griffin et al. | 345/168 |
| 6,611,254 B1 * | 8/2003 | Griffin et al. | 345/169 |
| 6,611,255 B2 * | 8/2003 | Griffin et al. | 345/169 |
| 6,873,317 B1 * | 3/2005 | Griffin et al. | 345/168 |
| 6,919,879 B2 * | 7/2005 | Griffin et al. | 345/168 |
| 7,056,043 B2 * | 6/2006 | Pletikosa | 400/472 |
| 7,153,049 B2 * | 12/2006 | Pletikosa | 400/472 |
| 7,227,536 B2 * | 6/2007 | Griffin et al. | 345/169 |
| 2003/0095107 A1 | 5/2003 | Griffin et al. | |

FOREIGN PATENT DOCUMENTS

| | | |
|---|---|---|
| EP | 1628188 A | 2/2006 |
| WO | 03056784 A | 7/2003 |

OTHER PUBLICATIONS

European Search Report 06252962.3, Oct. 11, 2006.

* cited by examiner

*Primary Examiner*—Danh C Le
(74) *Attorney, Agent, or Firm*—Novak Druce + Quigg LLP

(57) ABSTRACT

Wireless handheld mobile communication device including a housing with a display above a keyboard exposed for user actuation. A length of the device is greater than the width. Each key of a right-hand keyfield has a longitudinal axis oriented at a left-to-right inclined angle while each key of a left-hand keyfield has a longitudinal axis oriented at a right-to-left inclined angle from the vertical centerline. A left boundary of the keyboard is located adjacent the left lateral side edge of the device and the right boundary of the keyboard is located adjacent the right lateral side edge of the device so that the keyboard spans a substantial entirety of the width of the device.

35 Claims, 18 Drawing Sheets

ANGULAR KEYBOARD FOR A HANDHELD MOBILE COMMUNICATION DEVICE

FIELD

This disclosure relates to a handheld electronic device that includes a keyboard having a plurality of externally accessible and individually actuable keys, and wherein operation of the keyboard can be selectively disabled.

BACKGROUND

The keyboard of a handheld electronic device, and more particularly, handheld mobile communication devices, can be used to enter text for sending messages electronically, as well as to dial phone numbers for voice calls. The keyboard for text entry can take many different forms including a keyboard in which all letters of the alphabet are shown on respective keys.

Handheld mobile communication devices can be used to send electronic mail and other data messages. These types of communications often take time to enter the desired text and cause the user fatigue and difficulty of use. Even though these devices have the ability to send text messages, the entry of text requires skill and can be laborious, causing user fatigue. The layout of a standard QWERTY array of keys can be advantageously arranged where the keys are not vertically aligned. Furthermore, handheld mobile communication devices are today being designed with smaller widths which present a challenge in designing a keyboard that is both easy to use and has large enough keys for a user. Users of handheld communication devices often make use of their thumbs for striking the keys.

BRIEF DESCRIPTION OF THE DRAWINGS

Exemplary arrangements conducted and configured according to the advantageous solutions presented herein are depicted in the accompanying drawings where in:

FIG. 13 illustrates an exemplary Dvorak keyboard layout;

FIG. 14 illustrates a QWERTY keyboard layout paired with a traditional ten-key keyboard;

FIG. 15 illustrates ten digits comprising the numerals 0-9 arranged as on a telephone keypad, including the * and # astride the zero;

FIG. 16 illustrates a numeric phone key arrangement according to the ITU Standard E. 161 including both numerals and letters;

DETAILED DESCRIPTION

Figure 1:
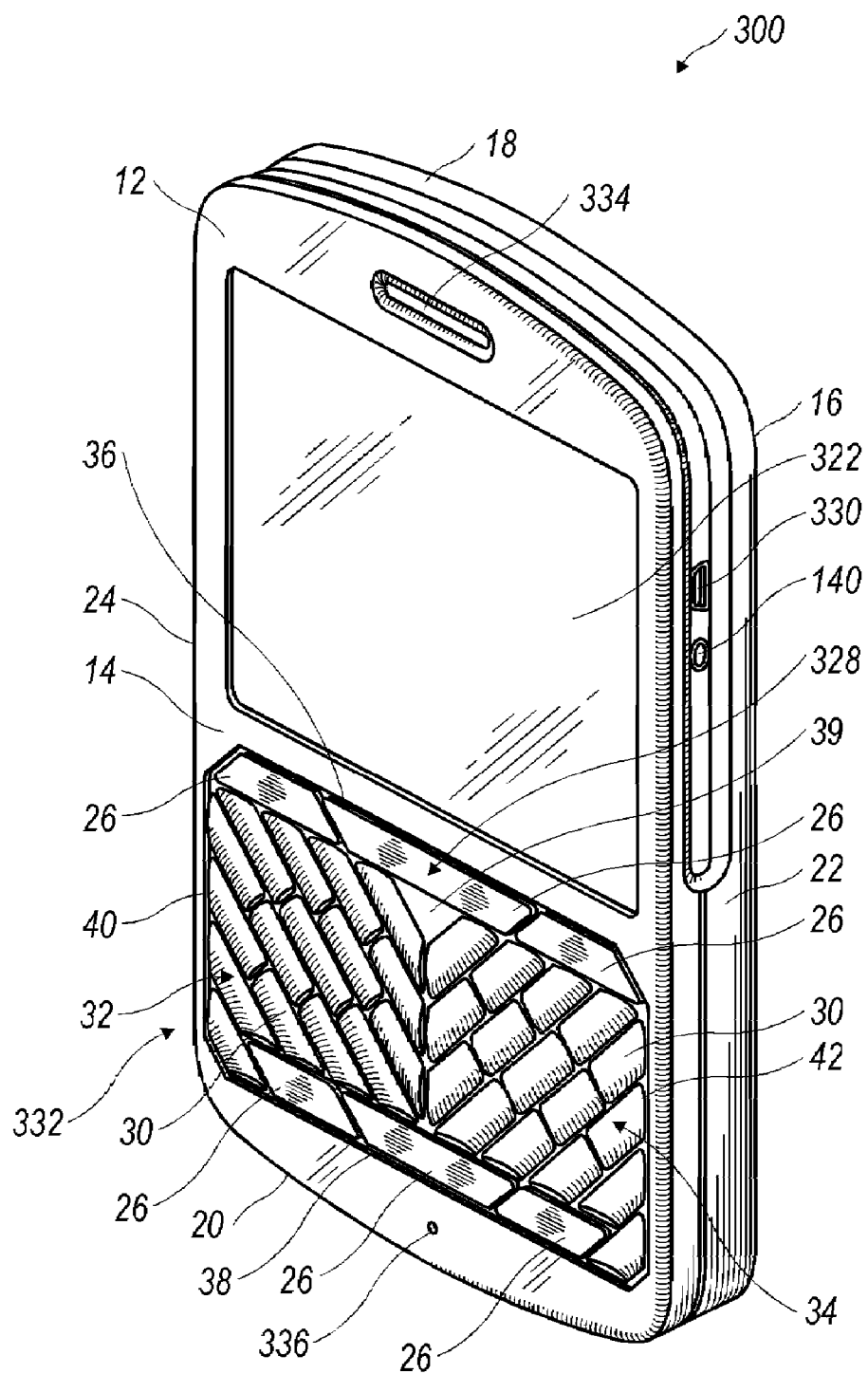
FIG. 1 is an isometric view of a handheld mobile communication (handheld electronic) device comprising an angular keyboard.
Figure 2:
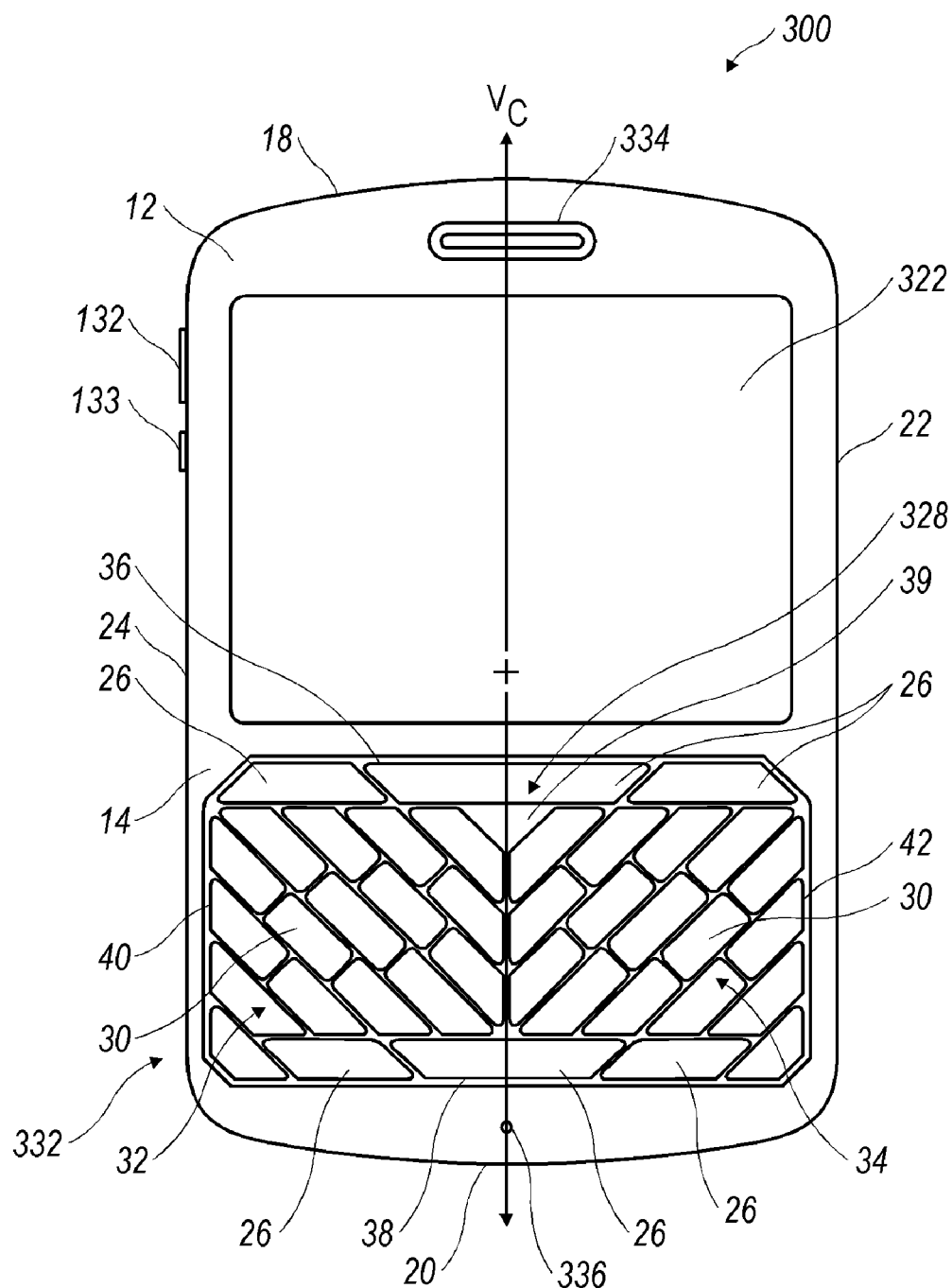
FIG. 2 is a front view of the handheld mobile communication device of FIG. 1.

It should be appreciated at the outset that while the instant disclosure describes one or more preferred embodiments of an angular keyboard, such embodiments are presented solely for purposes of illustration and the scope of the appended claims is not intended to be limited to the specific embodiments described in the instant disclosure or illustrated in the attached figures.

The instant disclosure relates to handheld electronic devices and more particularly to mobile handheld communication devices comprising angular keyboards. As used herein, the term "handheld electronic device" describes a relatively small electronic device that is capable of being held in a user's hand. "Handheld electronic device" is a broad term that includes devices further classified as handheld communication devices, and mobile handheld communications devices, which can interact with one or more communications networks to transmit and receive data of various types, e.g., text, voice, data, etc.

The angular keyboard disclosed herein can be a full keyboard. A full keyboard refers to a keyboard on which all the keys of the alphabet are shown as indicia on the keys. Reference to a full keyboard in the remainder of the disclosure can be abbreviated as "keyboard." Furthermore, "keyboard" can also be used to refer to an angular keyboard. The format of the indicia shown on the keys can comprise, for example, the letters A-Z in one of a standard keyboard layout and/or numerals as described later in this writing. Examples of different types of standard keyboard layouts include, but are not limited to: QWERTY, QWERTZ, AZERTY, and Dvorak layouts. In the embodiments disclosed, the keyboard is secured to the housing and the keys are located on the face side of the device.

In the alternative to comprising a full keyboard, the angular keyboard can be configured to comprise a plurality of keys wherein alphabetic letters are associated with the keys, but at least a portion of the individual keys have multiple alphabetic letters associated therewith. This type of configuration is referred to as a reduced keyboard (in comparison to the full keyboard described immediately above) and can, among others comprise QWERTY, QWERTZ, AZERTY, and Dvorak layouts.

Generally, typing or inputting information on a handheld electronic device is typically performed by using the thumbs to strike the keys. The motion of the thumbs while holding a handheld electronic device is different when compared with the typical motion that a typist uses when using a standard sized keyboard, e.g., a typewriter, word processor, or keyboard that is attached to a computer. The fingers used to type on standard typewriters, word processing machines, e.g. desktop computers, or other data entry devices, typically involves holding the hands and fingers over a set of keys that make up a so-called home row of keys. Typing on a handheld electronic device, on the other hand, does not allow a user to use of all of his/her fingers because the device is too small to accommodate the use of all of the fingers. Consequently, users of such handheld mobile communication/electronic devices are forced to employ a "hunt and peck" type style of entry, use their thumbs, or use some other type of entry that is different from the typical motion of a typist that uses a regularly sized keyboard. This condition is further aggravated by the use of smaller devices in which the keys of the keyboard are made smaller and/or closer to one another.

Additionally, the range of motion of the human thumb is different from that of the human fingers. Typing on a keyboard of a handheld mobile communication device can be described by the way the user strikes keys and holds the device. When the user desires to type on the handheld mobile communication device, the device is rested in one or more palm(s) of the user's hand and the thumbs are used to perform the key striking. The thumbs of a user generally move along diagonal motion lines relative to the housing of the device.

Referring now to the figures, arranging the keys along the above-described diagonal motion lines allows a user to more naturally strike the keys. Additionally, such arrangement of the keys allows a user to type with increased accuracy and ease. Furthermore, as illustrated in the figures, the keys can be shaped in a manner to provide additional ergonomic and intuitive feel to the keyboard, e.g., the keys can have a semi-cylindrical cross-sectional shape, and/or have trapezoidal and substantially parallelogram-type shapes.

As illustrated in FIGS. 1-9 and 17-23, a handheld electronic device is generally illustrated by reference numeral 300. Handheld electronic device 300, which can comprise a mobile communications device, is seen as comprising housing 12 having front side 14, rear side 16, top side 18, bottom side 20, right side 22 and left side 24. In the figures, handheld electronic device 300 is illustrated as further comprising angular keyboard 332 (which can be a QWERTY keyboard), an electronic graphical display 322 (which can be an illuminable LED display), input buttons 26 (which may be left and right "mouse," telephone buttons for initiating or ending a telephone call, function buttons, keyboard buttons, etc.), cursor navigation controller assembly 328 for navigating a cursor about the electronic graphical display and causing execution of a selected function to be performed, speaker 334, and microphone 336. The handheld electronic device 300 can also comprise one or more inputs/outputs, for example, a USB port 330 (See FIG. 3), for among other things, providing power to the device, charging a battery, or transferring data to/from another electronic device. The handheld electronic device has a width D1, which is between 1 and 5 inches, and preferably between 2 and 3½ inches, and a height, D2, which is preferably between 2 and 5 inches (See FIG. 6).

As may be appreciated from FIG. 1, electronic display 322 is generally disposed above the angular keyboard 332 and is suitable for accommodating textual input to the handheld electronic device 300 when in an operable configuration. Preferably, the electronic display 322 and angular keyboard 332 are disposed on the front side 14 of the handheld electronic device 300. As shown, the device 300 is of unibody construction, but it is also contemplated that the device may be of an alternative construction such as that commonly known as "clamshell," "flip-phone," "sliding," or "rotating" style. The navigation cursor control assembly 328 and angular keyboard 332 are each generally located below the electronic display 322.

Referring now to FIGS. 1-3 and 4-6, which illustrate the angular keyboard 332 in more detail, angular keyboard 332 is generally rectangular in appearance and spans a substantial entirety of the width D1 of the device 300. Angular keyboard 322 is bounded by top 36, bottom 38, left 40 and right 42 keyboard sides. Left 40 and right keyboard 42 sides are generally parallel with respect to one another, but can be otherwise. Top 36 and bottom 38 sides can be, alone or in combination, linear (See FIGS. 1-7) or arced (See FIGS. 8-9 and 17-23), and the arced sides can be concave, convex or combinations thereof Preferably, the angular keys 30 and input keys 26 (function keys) of the keyboard contiguously extend from the left side 40 to the right side 42 of the keyboard and from the top side 36 to the bottom side 38 of the keyboard. Preferably, the angular keys 30 and input keys 36 are arranged so as to abut and/or serially adjoin one another along their respective sides so as to provide minimal clearance between adjacent keys while simultaneously allowing relative movement therebetween.

Generally, the keyboard 332 comprises a left-hand keyfield 32, which is located to the left of the vertical centerline Vc of the housing, and a right-hand keyfield 34, which is located to the right of the vertical centerline Vc of the housing. As illustrated more clearly in FIG. 5 each angular key 30 of the left and right-hand keyfields 32, 34 is disposed at an angle θ1 and θ2, respectively, along its longitudinal axes relative to the vertical centerline Vc. That is, the angular keys of the left-hand keyfield 32 are generally parallel with respect to one another and disposed along their longitudinal axes LKlong at a first angle θ1. Similarly, the angular keys of the right-hand keyfield 34 are generally parallel with respect to one another and disposed along their longitudinal axes RKlong at a second angle θ2. The first angle θ1 is generally opposite to that of the second angle θ2 and the two angles are oriented to correspond with the natural position and motion of the human thumbs when typing on the handheld electronic device 300. Consequently, the first and second angles θ1, θ2 are approximately −/+45 degrees as measured from the vertical centerline Vc. In other preferred embodiments, angles θ1 and θ2 can be between +/−20 to +/−80 degrees as measured from the centerline Vc of the housing.

The keys comprising the keyfields can be of several shapes that include, but are not limited to: substantially trapezoidal and substantially parallelogram shaped (rectangular and non-rectangular and possibly comprising arced side members to correspond with an arced side of the keyboard (e.g., 36, 38, 40, 42)). Also the lengths and widths of the various keys can vary depending on a number of factors, e.g., width and height of the device, width and height of the keyboard, etc.; albeit the length of the keys will typically be greater than the width. Further, in one embodiment, at least one key in each of the left and right-hand keyfields is trapezoidally shaped, and is preferably, isosceles trapezoidally shaped. Similarly, in an embodiment, at least one key in each of the left and right-hand keyfields is shaped in the manner of a parallelogram, which parallelogram can be rectangular or non-rectangular. Also, at least two keys, one from each of the left and right-hand keyfields, adjacent the vertical centerline Vc, are configured for abuttingly adjoining one another along line Vc. The abutting adjoinment of these two keys serves to form both a generally downward pointing arrow as well as void 39, which is discussed later in this writing. In some embodiments, a navigation controller assembly 328, or other auxiliary I/O device, can be disposed proximate, or within a portion of the void 39. As shown in FIGS. 1-3, 7-9 and 17-23, the lower right and left corners of the keyboard can form a diagonal edge.

Figure 17:
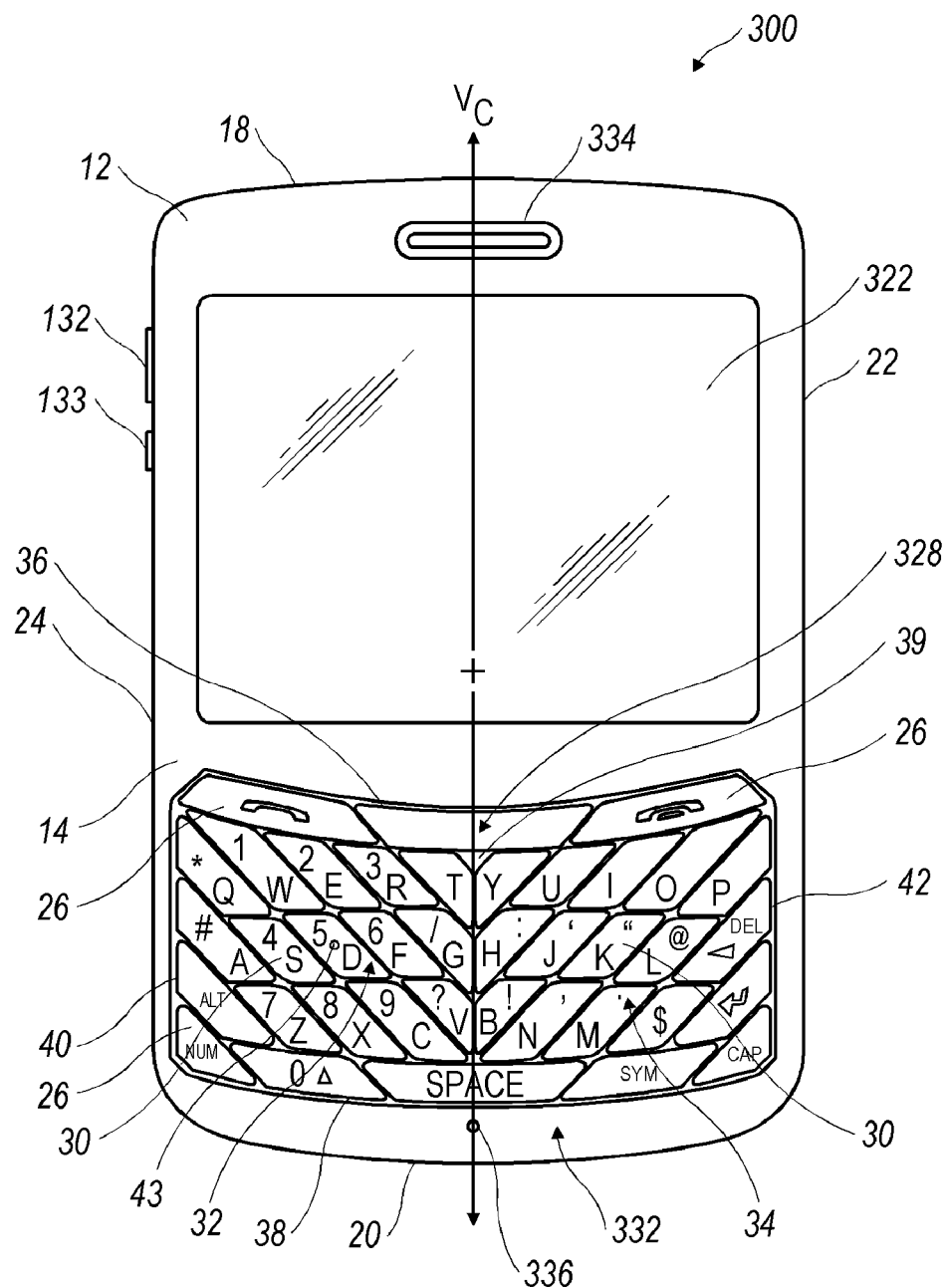
FIG. 17 is a front view of a handheld mobile communication device comprising a full QWERTY keyboard.
Figure 18:
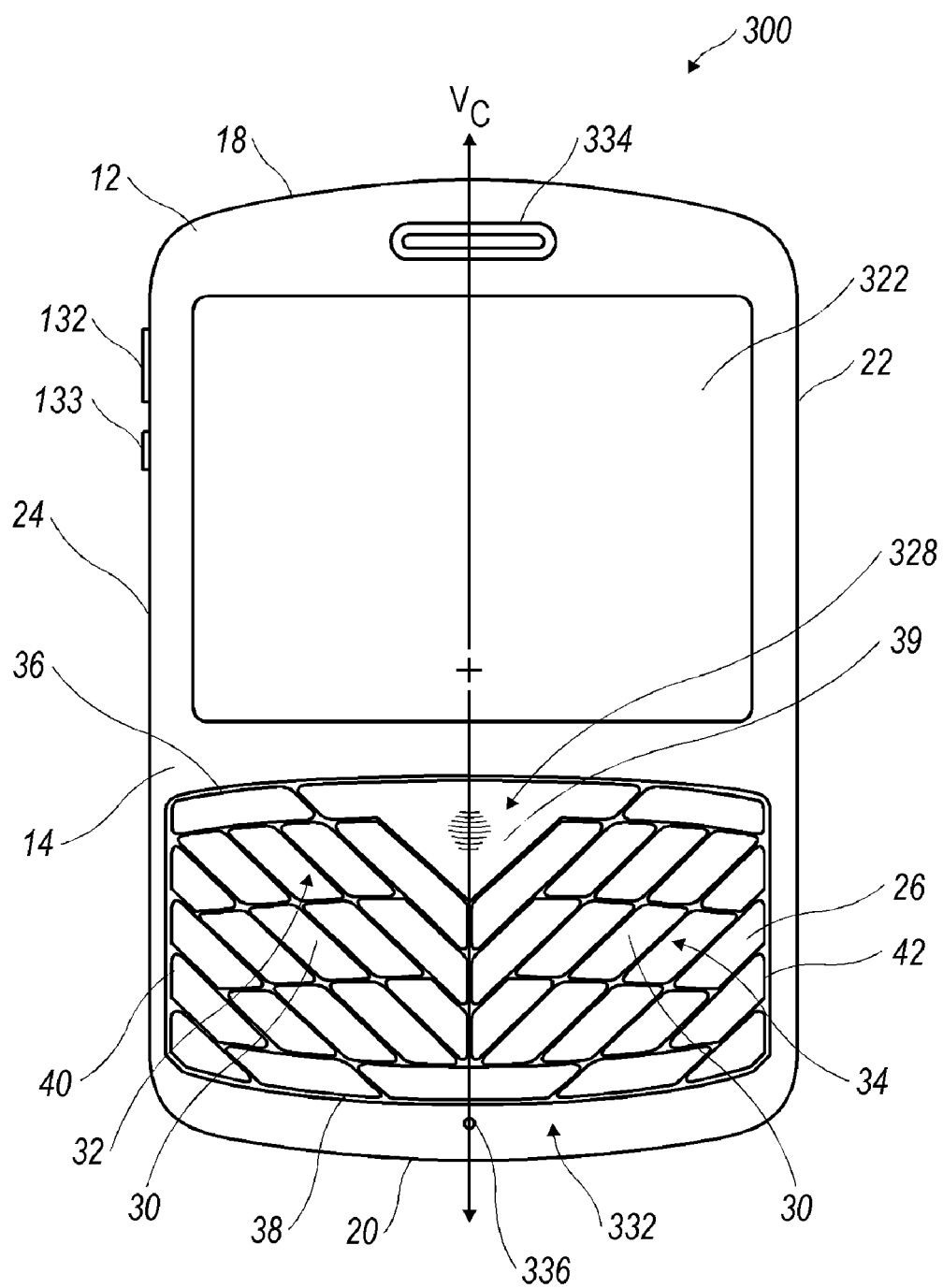
FIG. 18 is an isometric view of a handheld mobile communication device comprising an angular keyboard and a navigation controller assembly comprising a navigation key.
Figure 19:
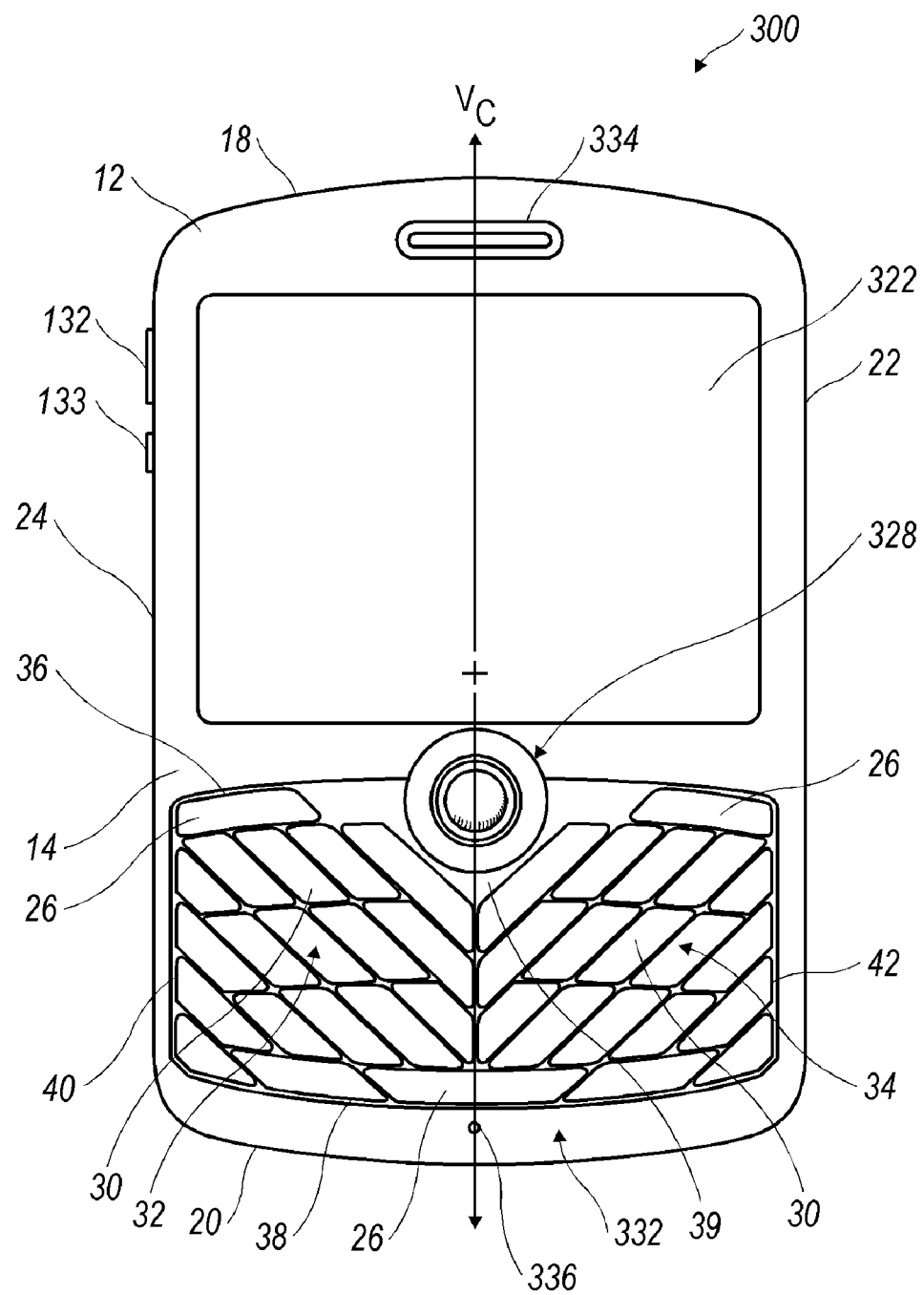
FIG. 19 is an isometric view of a handheld mobile communication device comprising an angular keyboard and a navigation controller assembly comprising a trackball.
Figure 20:
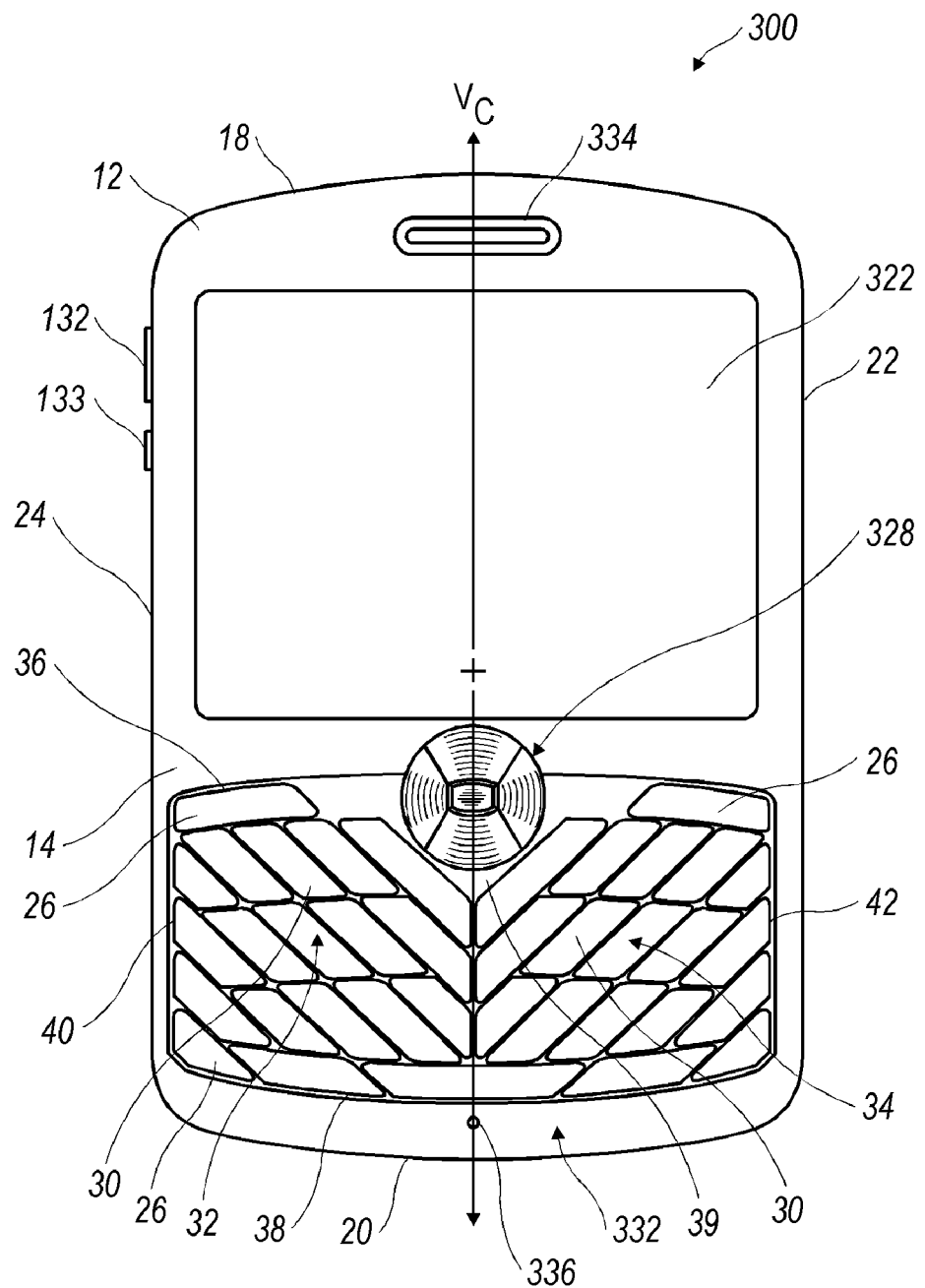
FIG. 20 is an isometric view of a handheld mobile communication device comprising an angular keyboard and a navigation controller assembly comprising cursor keys.
Figure 21:
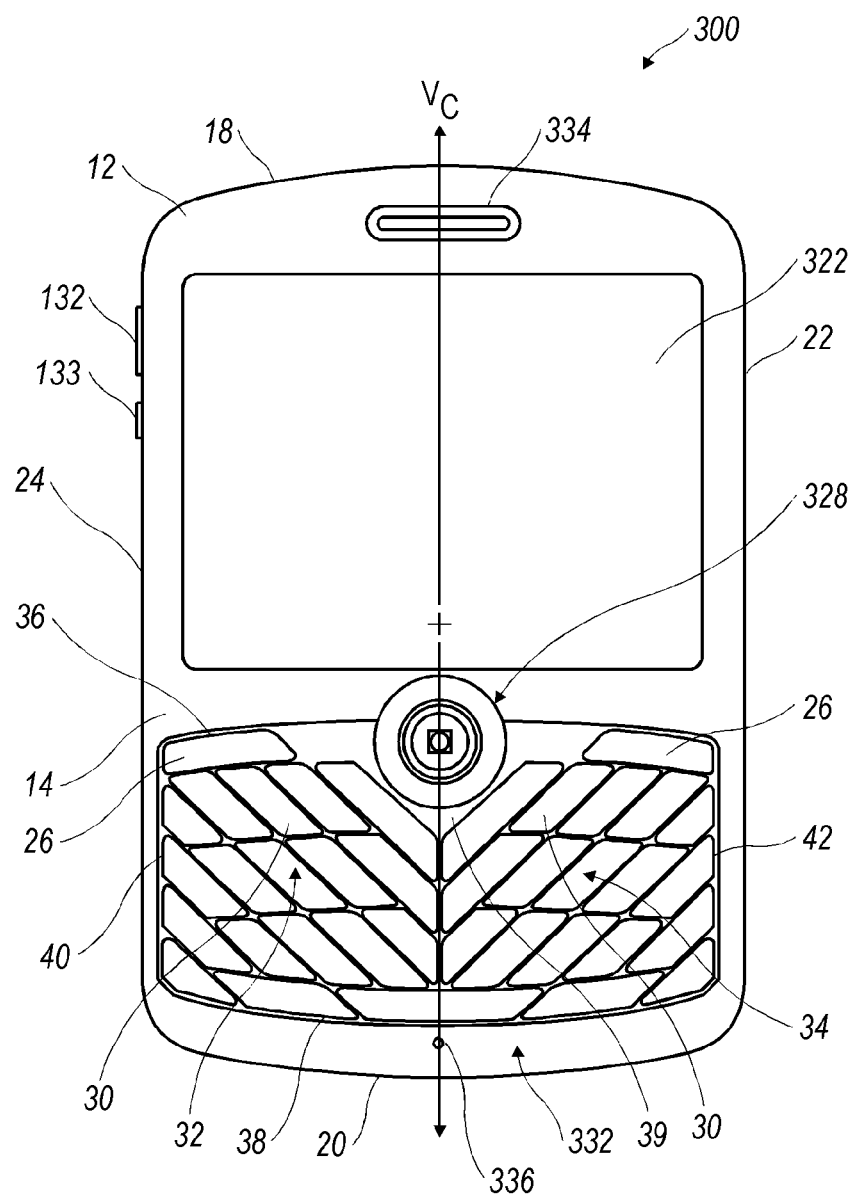
FIG. 21 is an isometric view of a handheld mobile communication device comprising an angular keyboard and a navigation controller assembly comprising a joystick.
Figure 22:
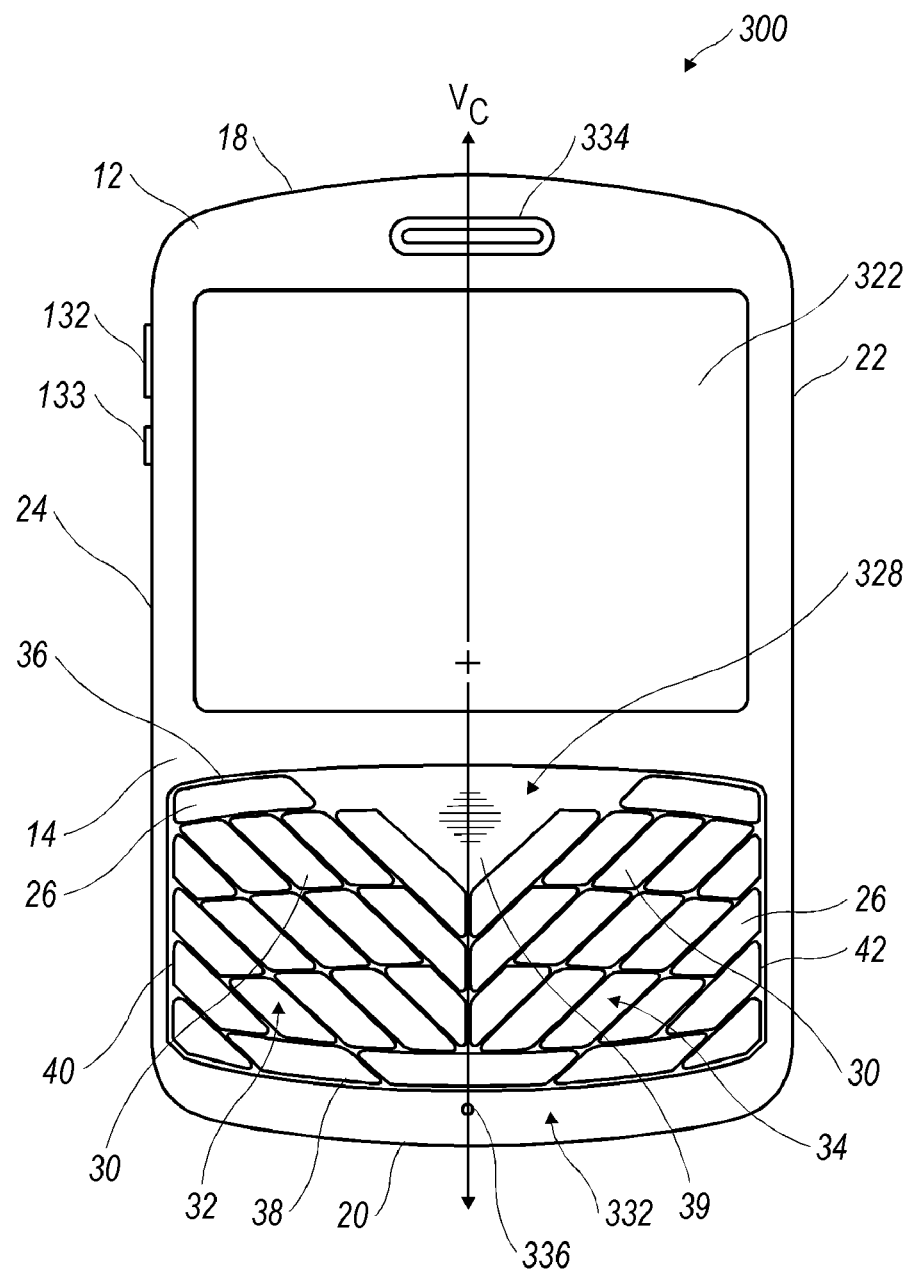
FIG. 22 is an isometric view of a handheld mobile communication device comprising an angular keyboard and a navigation controller assembly comprising a touchpad.
Figure 23:
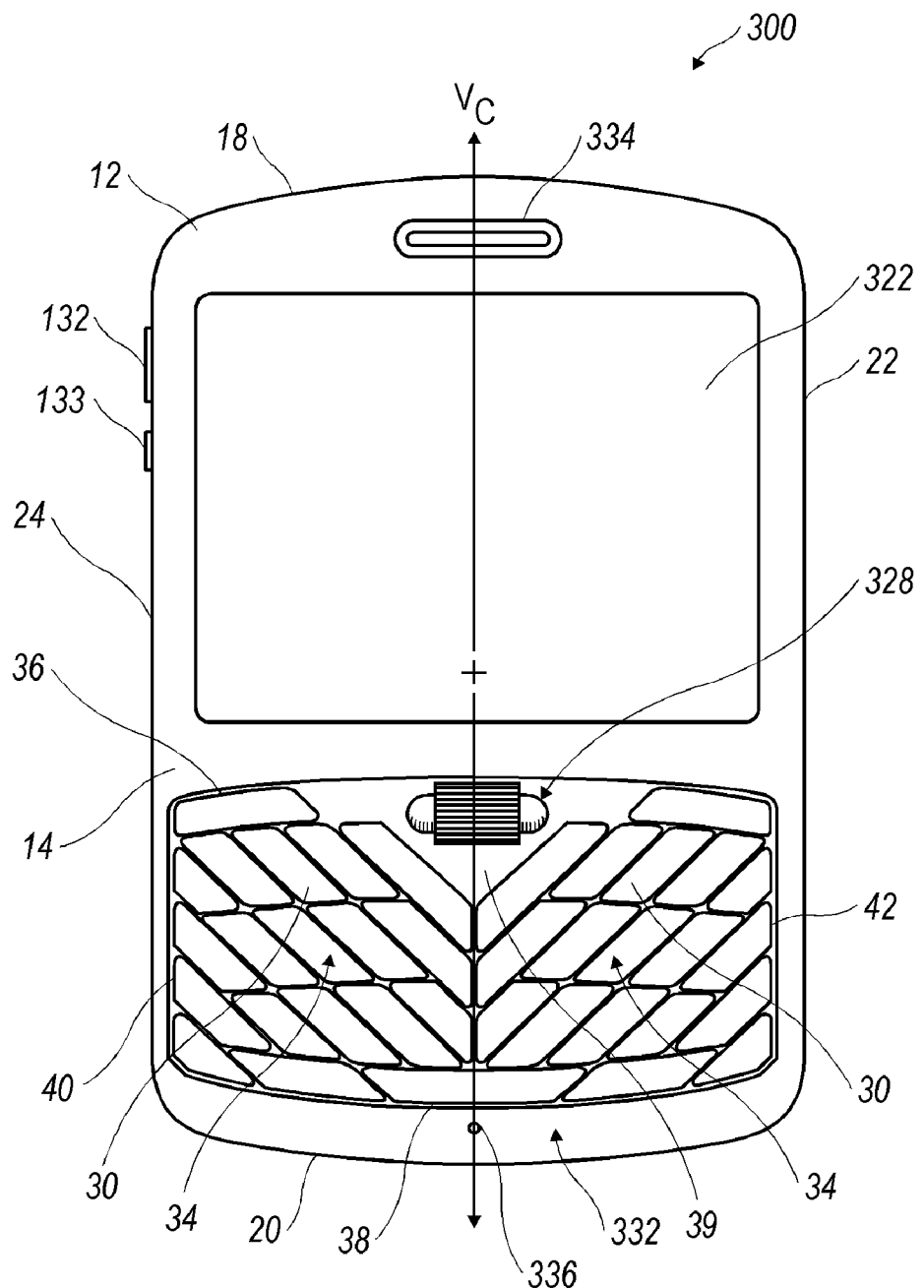
FIG. 23 is an isometric view of a handheld mobile communication device comprising an angular keyboard and a navigation controller assembly comprising a barrel roller.

As shown in FIG. 17, the angular keys 30 can be arranged such that the an upper row of keys in the left-hand keyfield 32 are keys "Q", "W", "E", "R", and "T." Another lower row of keys in the left-hand keyfield 32 can be: "A", "S", "D", "F", and "G." Still further, an even lower row of keys can comprise the keys "ALT", "Z", "X", "C", and "V". While these rows are described in relation to a standard QWERTY key arrangement, other types of arrangements including, but not limited to, QWERTZ, AZERTY, or Dvorak are considered to be within the scope of this disclosure. Likewise, an upper row in the right-hand keyfield 34 can comprise keys with indicia corresponding to letters "Y", "U", "I", "O", and "P". Further, a lower row can be composed of the keys with indicia corresponding to letters "H", "J", "K", "L", and symbol "<". As mentioned above, these comprise embodiments of a standard QWERTY array, and other known arrays can be used instead and remain within the scope of this disclosure.

The indicia on the keys are provided so that the indicia generally appear uprightly oriented along an imaginary horizontal line that extends across a row of keys; the indicia can also appear along an arced imaginary line, if desired. The indicia can comprise alphabetic indicia as well as numeric indicia and/or other functions and symbols. The layout of the alphabetic indicia is generally provided to present the user with a familiar and easy to follow keyboard arrangement. The above described alphabetic indicia can be arranged in one of QWERTY, QWERTZ, AZERTY, and Dvorak layouts. As further illustrated in FIG. 17, key 30 corresponding to the letter D and numeral 5 can also comprise a physical indicator, such as a dimple 43, which protrudes from the surface of the key, so that a user may tactilely orient his/hers thumb or finger with respect to the angular keyboard. Also, as shown in FIG. 1, the keys can be formed to comprise a rounded, cylindrical, contoured or other shaped upper surface such that it can be easier for a user to discriminate between the various keys.

Figure 6:
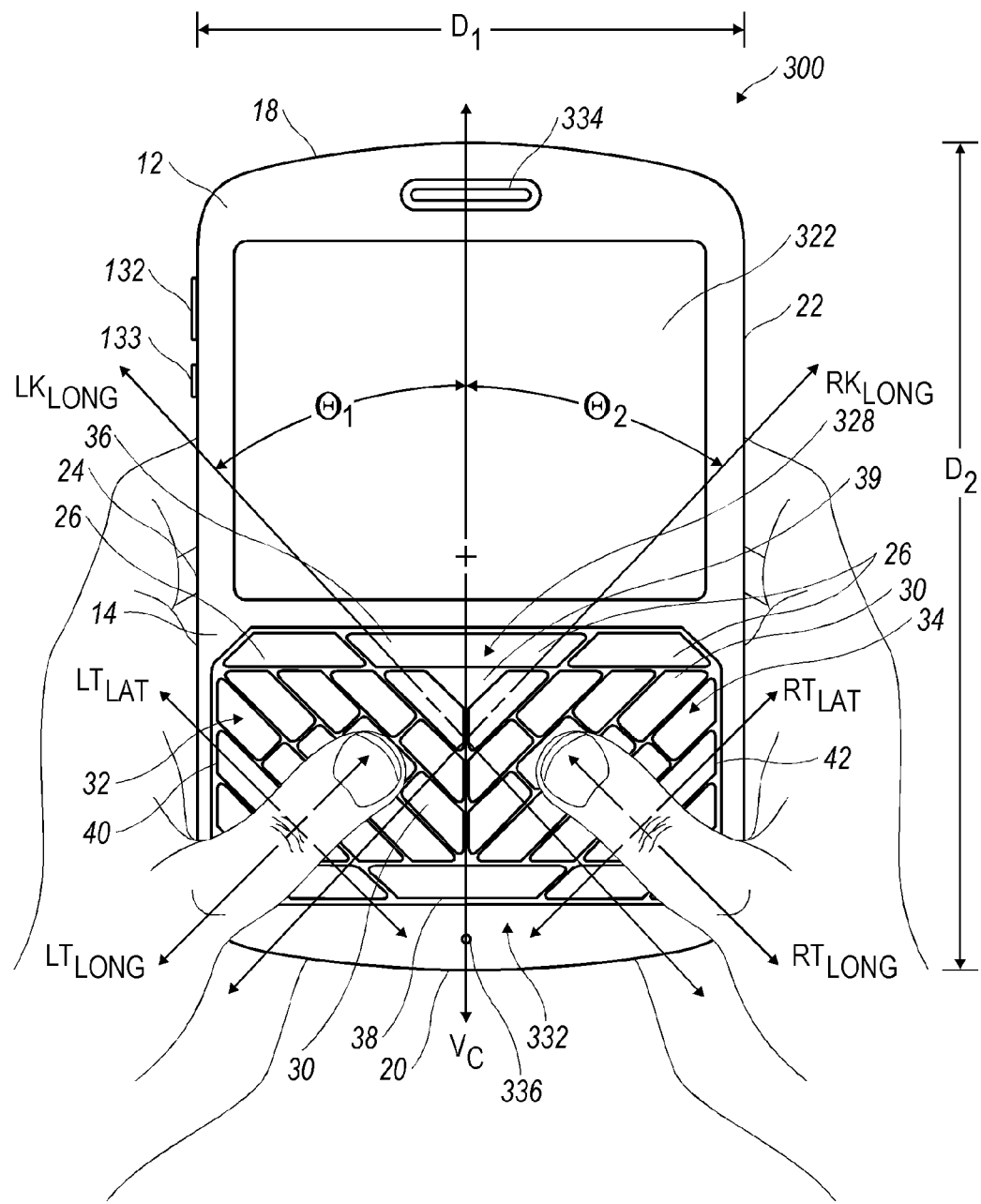
FIG. 6 is a front view of a handheld mobile communication device held in the hands of a user and further illustrating a typical orientation of the thumbs when held in such manner.

As illustrated in FIG. 6, when device 300 is placed in the palm(s) of a user's hand(s), the thumb(s) of the user are generally naturally diagonally oriented with respect to the housing and/or naturally diagonally oriented with respect to the vertical center Vc. Such diagonal orientation of the thumbs is best illustrated by lines RTlong (Right-Thumb-Longitude), RTlat (Right-Thumb-Latitude), LTlong (Left-Thumb-Longitude) and LTlat (Left-Thumb-Latitude), which represent the longitudinal and latitudinal axes of a user's right and left thumbs, respectively. From this view, it is seen that movement of a user's thumbs to actuate keys will most naturally and aptly occur along lines that are substantially parallel, or substantially perpendicular to these movement lines; that is, movement of the right thumb will most naturally occur along lines that are parallel to lines RTlong and RTlat and movement of the left thumb will most naturally occur along lines that are parallel to LTlong and LTlat.

Consequently, angularly orienting the keys of the right-hand keyfield 34 such that the longitudinal axes of the keys on the right side (RKlong (Right-Keyboard-Longitude)) of the vertical centerline Vc are perpendicular to the longitudinal axis of the right thumb (RTlong) allows the user to more easily strike the various keys of the right-hand keyfield 34 with the right thumb according to the user's natural position and movement thereof. Similarly, angularly orienting the keys on the left-hand keyfield 32 such that the longitudinal axes of the keys on the left side (LKlong(Left-Keyboard-Longitude)) of the vertical centerline Vc are perpendicular to the longitudinal axis of the left thumb (LTlong), allows a user to more easily strike the various keys with the left thumb according to the user's natural position and movement thereof. Accordingly, arranging the keys in this manner makes it easier for the user to use the device and increase accuracy.

When arranged in the above-described manner, the trapezoidal and parallelogram shaped keys of each of the left and right-hand keyfields 32, 34 maintain substantial parallel and angularly oriented relationship with the keys in their respective keyfield—along angles θ1 and θ2, respectively. As a result, the left and right-hand keyfields can appear as mirror images of each another. Alternatively, one of the left and right-hand keyfields can be configured to comprise one or more keys, or one or more keys thereof can be differently oriented.

As illustrated in 1, 2, 5-9 and 17-23, void 39 is formed near the top row of the keyboard proximate the nexus of the left-hand keyfield 32 and right-hand keyfield 34. This void 39 is useful because it provides a natural location for accommodating a navigation controller assembly 328 (also known as an auxiliary I/O device), which can be useful for navigating a cursor on the electronic display 322, or for other purposes. As illustrated more clearly in FIGS. 1, 2, 5-9 and 17-23, the navigation controller assembly 328 can comprise several forms that include, but are not limited to: cursor keys, trackball, navigation wheel, joystick, touchpad, or barrel roller, among other types of auxiliary input devices. The location of the auxiliary I/O device 328 between the display 322 of the handheld communication device 300 and the angular keyboard 332 provides the user with a familiar location for the navigation controller assembly 328. The void 39 provided by the nexus of the left-hand keyfield 32 and the right-hand keyfield 34 allows freedom of movement away from other keys on the keyboard and, and as illustrated in FIGS. 1 and 17-23, the size and shape of this area can vary depending on, among other things, the angle of orientation of the keys 30, the width D1 and height D2 of the handheld electronic device, the disposition of the top 36, bottom 38, left 40 and right 42 sides of the keyboard 328 (linear versus arcuate), key length, key width and the like.

Figure 5:
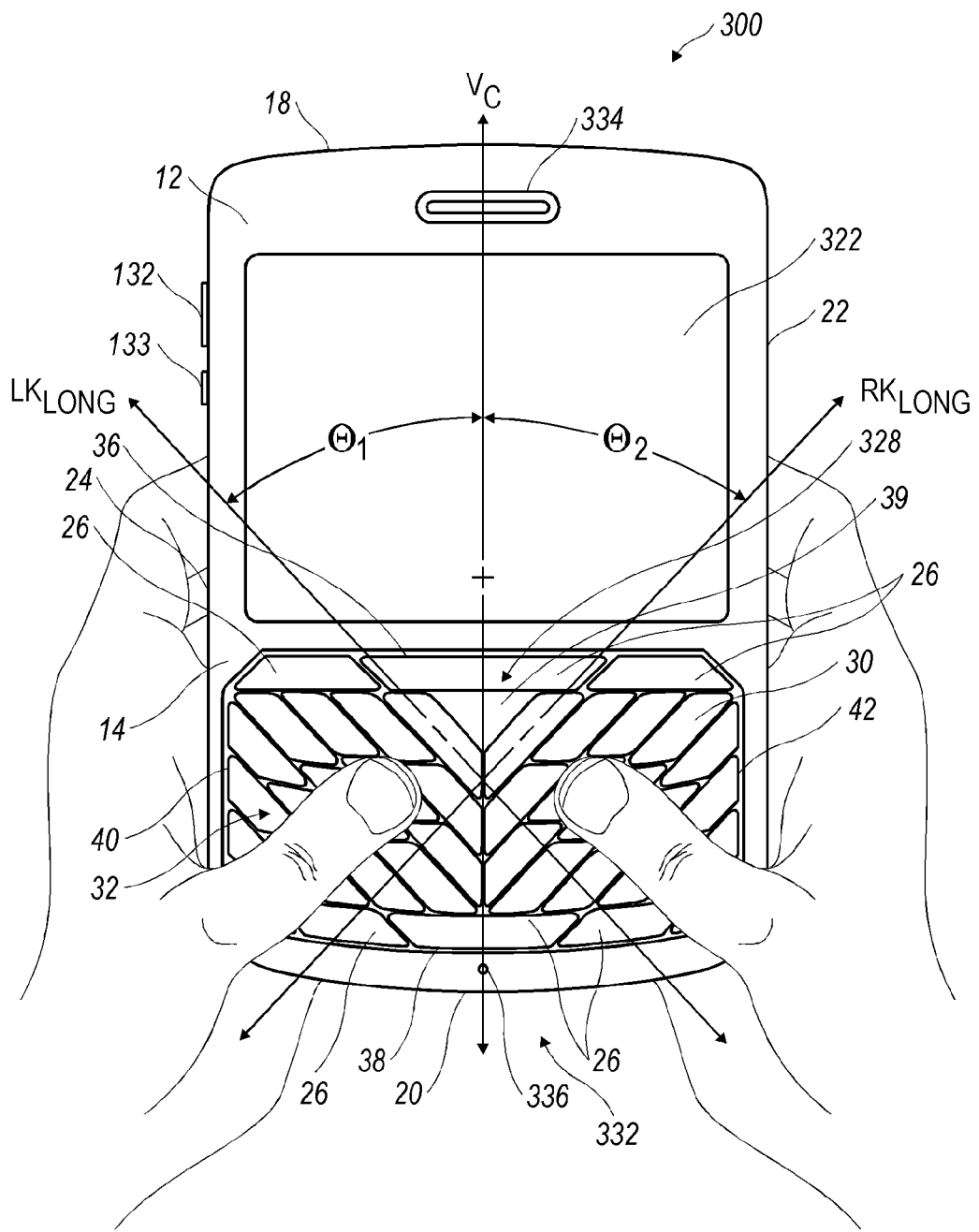
FIG. 5 is a front view of a handheld mobile communication device held in the hands of a user and further illustrating longitudinal axes of a pair of angularly disposed keys thereof.
Figure 7:
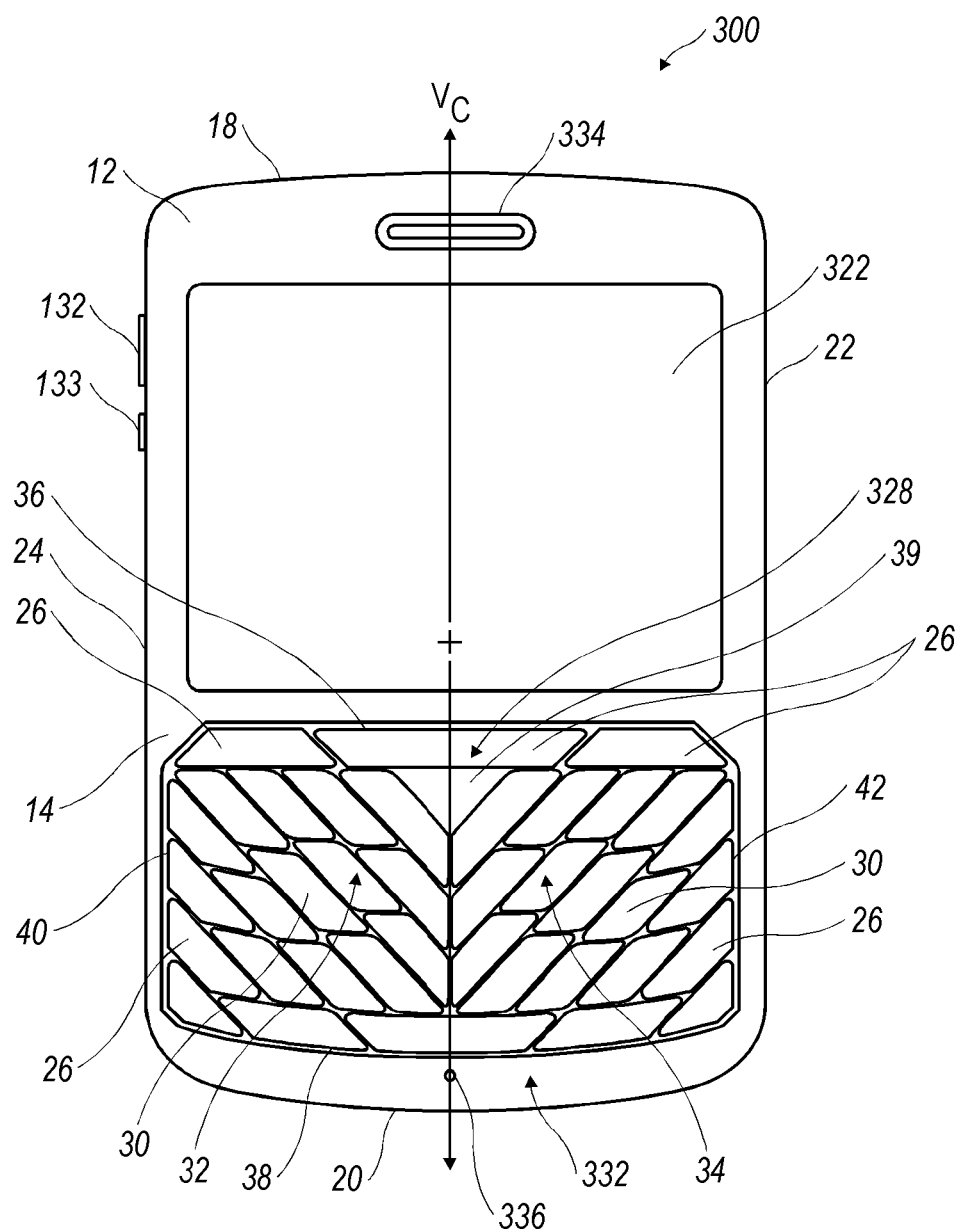
FIG. 7 is a front view of a handheld mobile communication device comprising an angular keyboard wherein the top of the keyboard is horizontal and the bottom of the keyboard is arcuate (convex).
Figure 8:
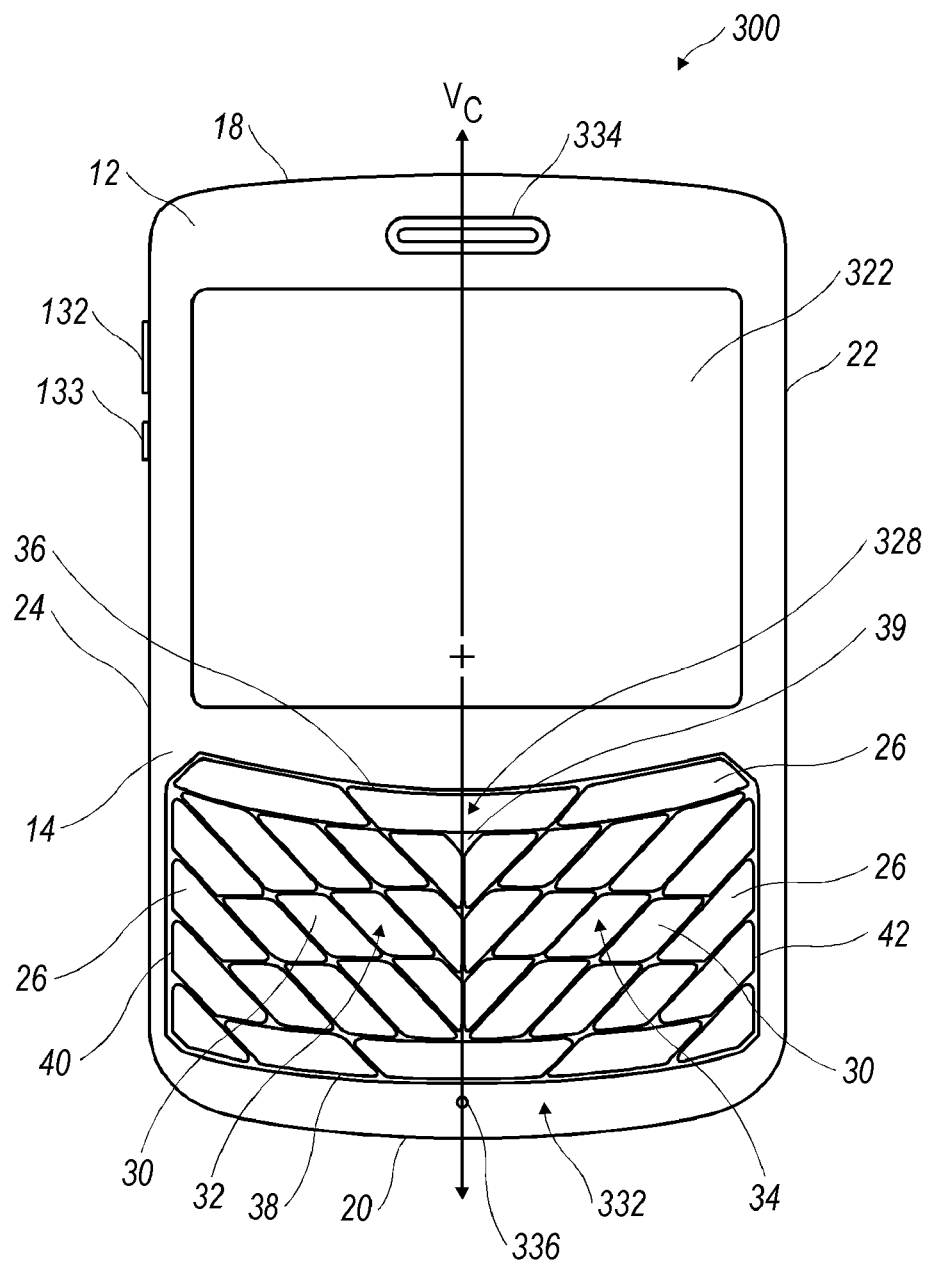
FIG. 8 is a front view of a handheld mobile communication device comprising an angular keyboard wherein the top side and bottom side of the keyboard is arcuate; (concave and convex, respectively)
Figure 9:
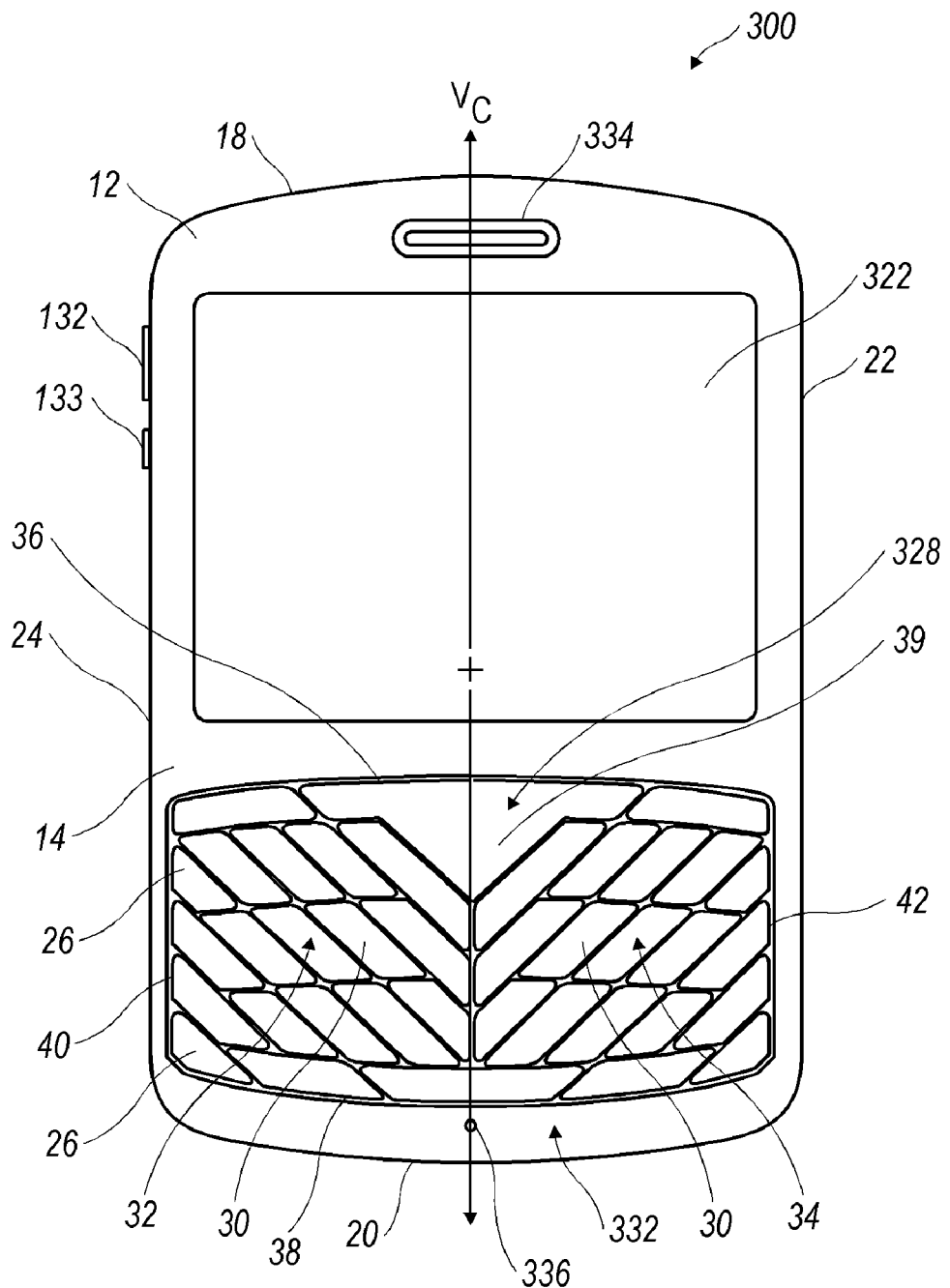
FIG. 9 is a front view of a handheld mobile communication device comprising an angular keyboard wherein the top and bottom of the keyboard is arcuate (convex and convex)

As shown in FIG. 17, the left and right-hand keyfields 32, 34 can be configured such that the angular keys 30 are bound by one or more input keys 26 to form the top side 36 and bottom side 38 of the keyboard. Preferably, the input keys 26 forming the top side 36 and bottom side 38 of the keyboard comprise one or more function keys; e.g., CALL SEND, CALL END, ALT, SPACEBAR, RETURN, BACKSPACE, SYMBOL, or SHIFT keys and the like. In some embodiments, the function keys can be integrated with the keys of the left and right-hand keyfields. Alternatively, as shown in FIGS. 1, 2 and 5-7, the function keys can be located above or below the left and right-hand keyfields and can be arranged to form a generally horizontal line. In other embodiments, as shown in FIGS. 5-9 and 17-23, the functions keys can comprise arced sides or can be aligned substantially along arcs to thereby form convex or concave top sides 36 and bottom sides 38. The arcs forming the top and bottom sides can be identical, or different from one another and different arrangements of the function keys are described in relation to several figures. For example, FIGS. 5-7 show a handheld electronic device 300 comprising an angular keyboard wherein the top side 36 of the keyboard is horizontal and the bottom side 38 of the keyboard is arcuate. FIGS. 8, 9 and 17-23 show a handheld electronic device wherein the top side 36 and bottom side 38 of the keyboard are arcuate and FIG. 17 shows a handheld electronic device comprising an angular keyboard wherein the top side 36 of the keyboard is concave and the bottom side 38 of the keyboard is convex.

As previously indicated, as shown in FIG. 1, the shape of keys of the left and right-hand keyfields can be contoured or rounded. The contoured or rounded shape is such that it provides more ergonomic data entry using the keys; that is, it is easier for a user to tactilely differentiate between the various keys of the keyboard. In a preferred embodiment, the keys of the left and right-hand keyfields are of an arcuate or contoured cross-sectional shape, and as shown, have a substantially cylindrical cross-sectional shape.

Figure 4:
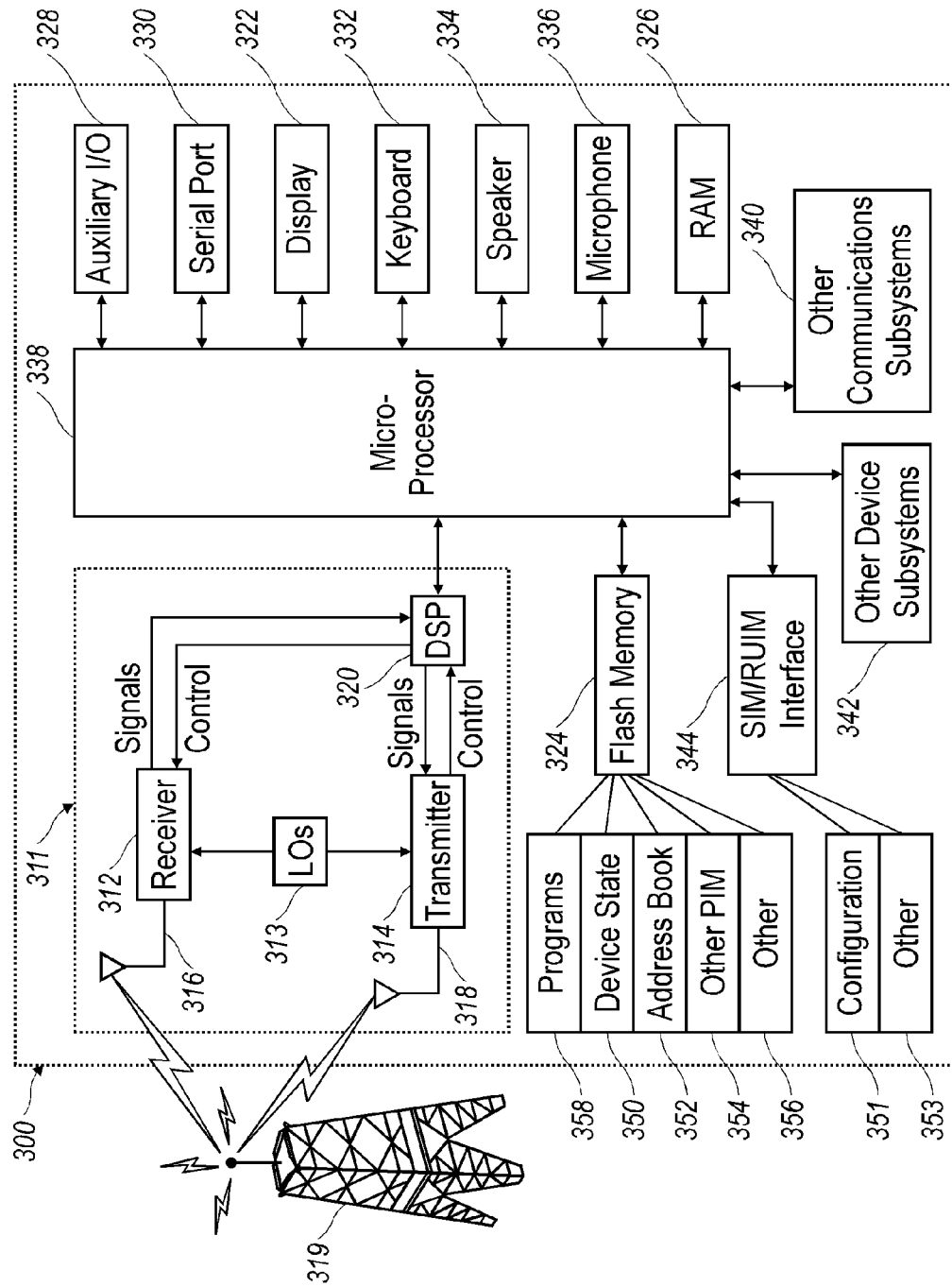
FIG. 4 is a block diagram representing a wireless handheld communication device interacting in a communication network.
Figures 13, 14, 15, 16:
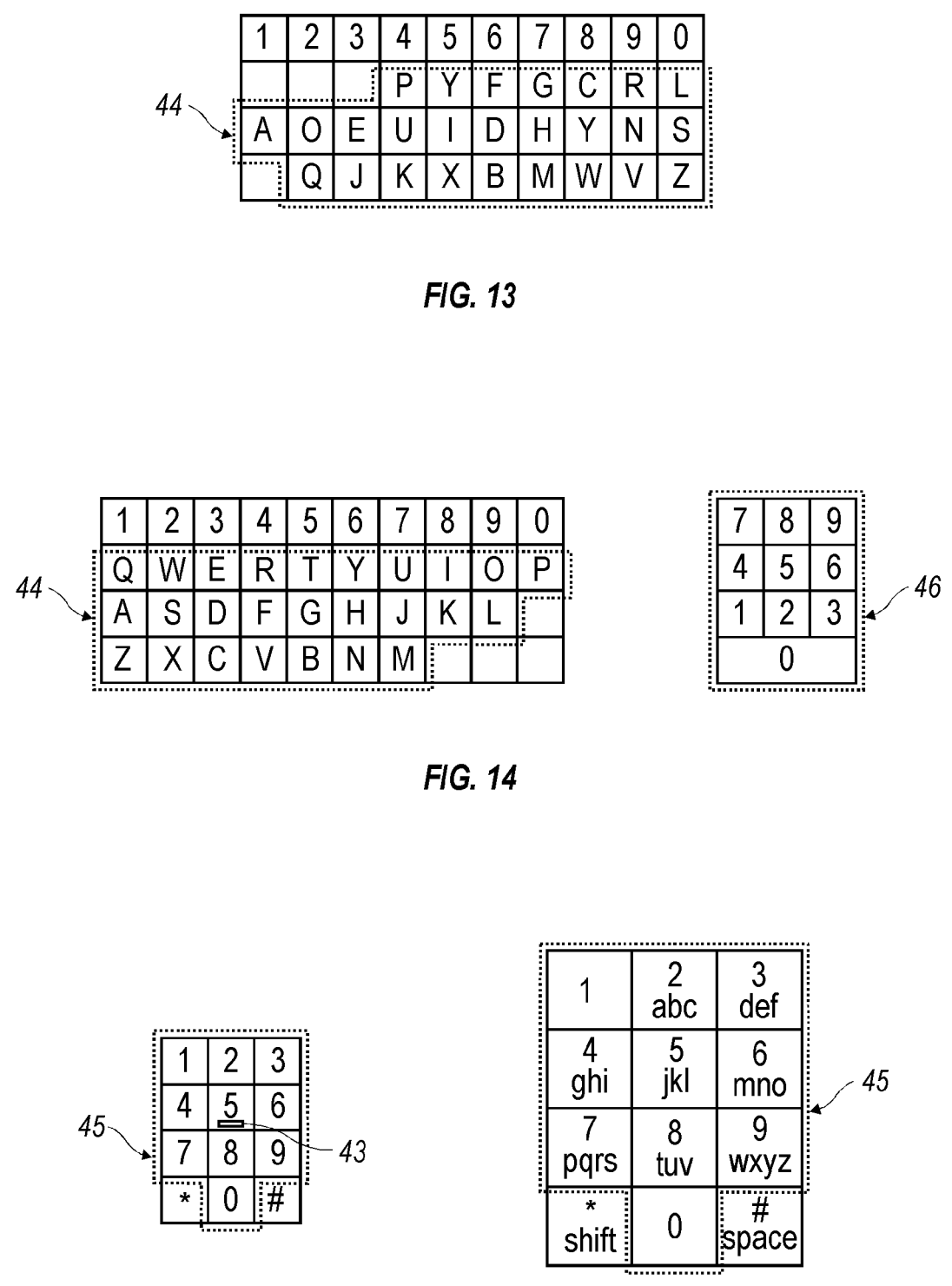

As shown in FIG. 4, the handheld electronic device is capable of various forms of communication and the arrangement of keyboard 332 encourages efficient and ergonomic typing. This arrangement enables user's to send text messages that can take many forms including electronic mail messages. In a preferred embodiment, the handheld electronic device is equipped to communicate with a wireless system to allow a user to place telephone calls. As shown in FIGS. 15-17, in addition to comprising a plurality of keys corresponding to letters of the alphabet, the keyboard 332 can also be configured to comprise a standard telephone keypad layout as an overlay of indicia on some of the keys in the left-hand keyfield, or right-hand keyfield. Such configuration allows for efficient use of both text and voice communication modes.

The various characters, commands and functions associated with keyboard typing, in general, are traditionally arranged using various conventions. The most common of these in the United States, for instance, is the QWERTY keyboard layout. Others include the QWERTZ, AZERTY, and Dvorak keyboard configurations.

Figure 10:
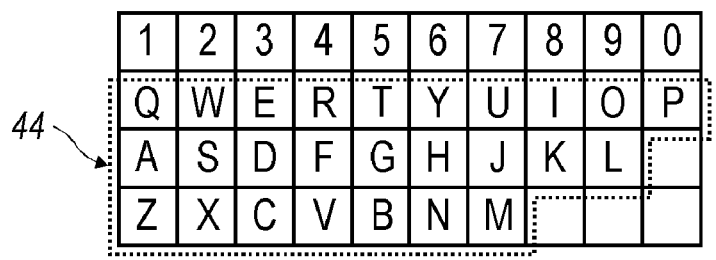
FIG. 10 illustrates an exemplary QWERTY keyboard layout.

The QWERTY keyboard layout is the standard English-language alphabetic key arrangement 44 (see FIG. 10). In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878.

Figure 11:
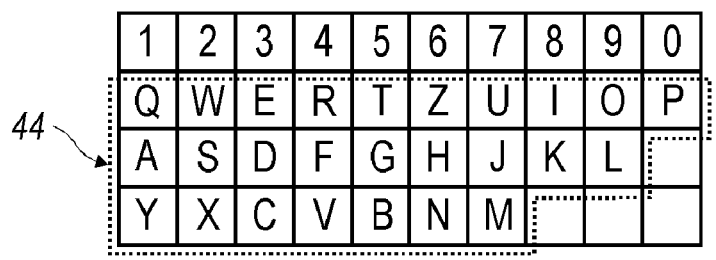
FIG. 11 illustrates an exemplary QWERTZ keyboard layout.

The QWERTZ keyboard layout is normally used in German-speaking regions. This alphabetic key arrangement 44 is shown in FIG. 11. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

Figure 12:
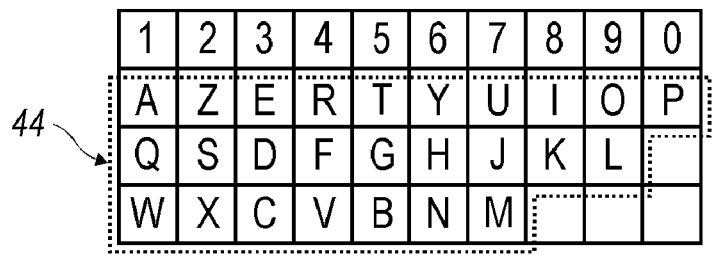
FIG. 12 illustrates an exemplary AZERTY keyboard layout.

The AZERTY keyboard layout is normally used in French-speaking regions. This alphabetic key arrangement 44 is shown in FIG. 12. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

The Dvorak keyboard layout was designed in the 1930s by August Dvorak and William Dealey. This alphabetic key arrangement 44 is shown in FIG. 13. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. An exemplary numeric key arrangement is shown in FIGS. 10-13 wherein the numbers 1-9 and 0 are positioned above the alphabetic keys. In another numeric key arrangement, numbers share keys with the alphabetic characters, such as for example, the top row of the QWERTY keyboard (not shown). Yet another exemplary numeric key arrangement is shown in FIG. 14, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a "ten-key"computer keyboard keypad. Additionally, a numeric phone key arrangement 45 is shown in FIGS. 15 and 16.

As shown in FIG. 16, the numeric phone key arrangement 45 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices include mobile stations, cellular telephones, wireless personal digital assistants (PDAs), two-way paging devices, and others. Various keyboards are used with such devices depending in part on the physical size of the handheld electronic device. Some of these are termed full keyboard, reduced keyboard, and phone key pads.

In embodiments of the handheld electronic device 300 having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

Other embodiments can comprise a full keyboard for alphabetic characters and incorporate a combined numeric keyboard. In this embodiment, numeric characters share keys with alphabetic characters on the top row of the QWERTY keyboard (not shown). Another embodiment incorporating a combined alphabetic/numeric keyboard is shown in FIG. 17. This device utilizes numeric characters in a numeric phone key arrangement 45 as shown in FIGS. 15 and 16. In the illustrated embodiment, the numeric characters share keys with alphabetic characters on the left side of the keyboard.

While not specifically illustrated in the appended drawings, in order to further reduce the size of the handheld electronic device 300 without making the physical keys or software keys too small, the handheld electronic device 300 can be configured to comprise a reduced keyboard, where more than one character/command/function is associated with each of at least a portion of the plurality of keys. Consequently, certain keys can be ambiguous since more than one character is represented by, or associated with, a particular key even though only one of those characters is typically intended by the user when activating the key.

Thus, a processor of handheld electronic device 300 can be programmed with software to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage. The software preferably also has the ability to recognize character letter sequences that are common to the particular language, such as, in the case of English, words ending in "ing." Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

Multi-tap has been in use for a number of years for permitting users to enter text using a touch screen device or a conventional telephone keypad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

The "text on nine keys" (T9®) system uses predictive letter patterns to allow a user to ideally press each key representing a letter only once to enter text. Unlike multi-tap which requires a user to indicate a desired character by a precise number of presses of a key, or keystrokes, T9 uses a predictive text dictionary and established letter patterns for a language to intelligently guess which one of many characters represented by a key that the user intended to enter. The predictive text dictionary is primarily a list of words, acronyms, abbreviations and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Further aspects of the environments, devices and methods of employment described hereinabove are expanded upon in the following details. An exemplary embodiment of the handheld electronic device 300 as shown in FIGS. 1, 5, 6 and 17 and is cradleable in one or more palm(s) the palm of a user's hand. The size of the device 300 is such that a user is capable of operating the device using the same hand that is holding the device. In an embodiment, the user is capable of actuating all features of the device 300 using a single thumb of the cradling hand. In an embodiment, the handheld device 300 features a keyboard 332 on the face of the device 300, which keyboard is actuable by the thumb of the hand cradling the device 300. As shown in FIGS. 5 and 6, the user may also hold the device 300 in such a manner to enable two thumbs to type on the device 300. Furthermore, the user may use fingers rather than thumbs to actuate the keys on the device 300. In order to accommodate palm-cradling of the device 300 by the average person, the length, or height, of the device, D2, is generally greater than the width D1 (See FIG. 6), and the width is preferably between approximately two and three inches, but by no means limited to such dimensions.

The handheld electronic device 300 includes an input portion and an output display portion. The output display portion can be a display screen 322, such as an LCD or other similar display device.

The input portion includes a plurality of keys that can be of a physical nature such as actuable buttons or they can be of a software nature, typically constituted by virtual representations of physical keys on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

In the case of software keys, the indicia for the respective keys are shown on the display screen, which in one embodiment is enabled by touching the display screen, for example, with a stylus to generate the character or activate the indicated command or function. Such display screens may include one or more touch interfaces, including a touchscreen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Thus, the desired character, command or function is obtained by depressing the physical key corresponding to the character, command or function displayed at a corresponding position on the display screen, rather than touching the display screen 322. To aid the user, indicia for the characters, commands and/or functions most frequently used are preferably positioned on the physical keys and/or on the area around or between the physical keys. In this manner, the user can more readily associate the correct physical key with the character, command or function displayed on the display screen 322.

Figure 3:
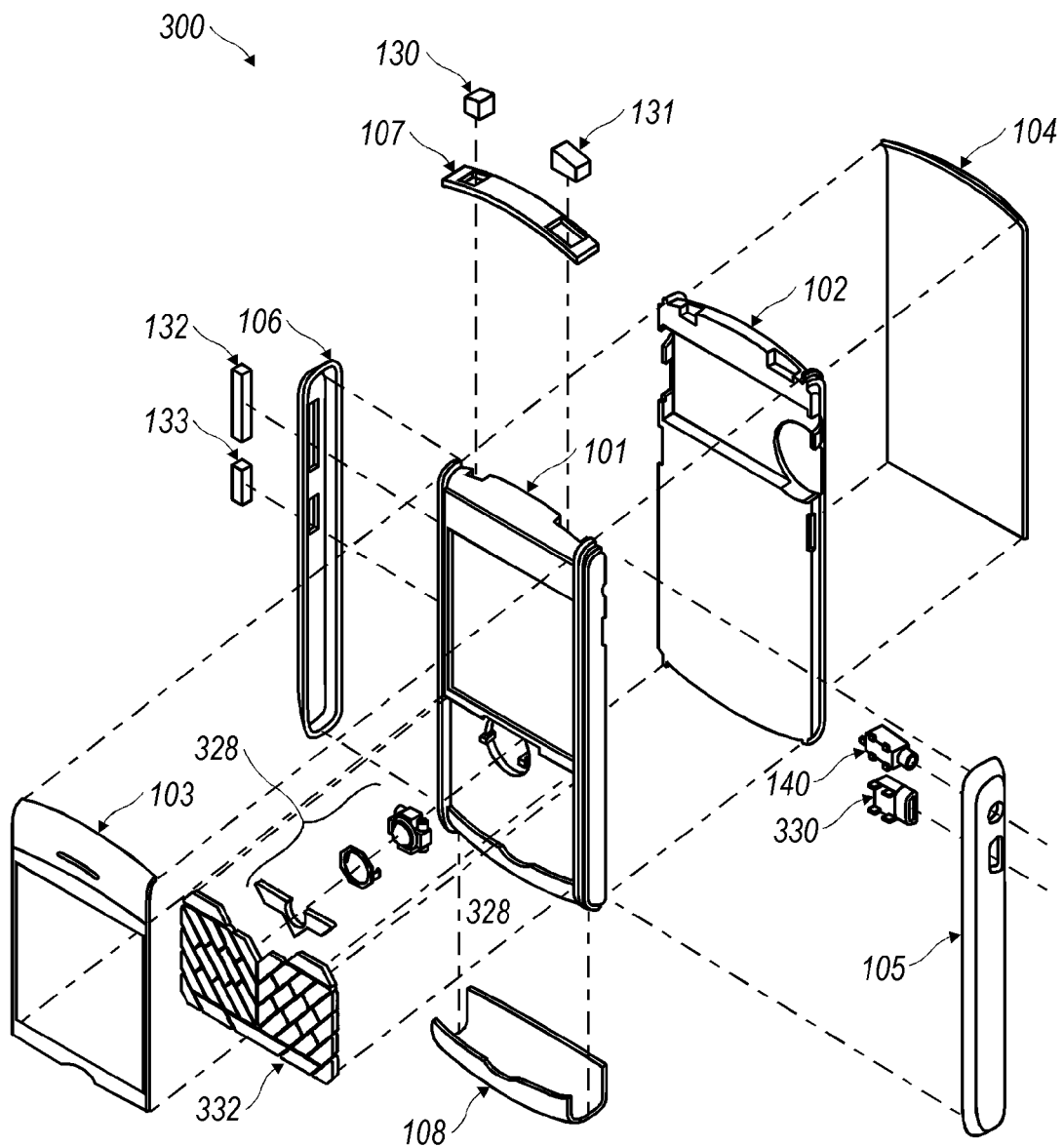
FIG. 3 is an exploded perspective view of an exemplary wireless handheld electronic device incorporating an angular keyboard and roller trackball device as an auxiliary user input.

An exemplary handheld electronic device 300 is shown in the assembly drawing of FIG. 3 and its cooperation in a wireless network is exemplified in the block diagram of FIG. 4. These figures are exemplary only, and those persons skilled in the art will appreciate the additional elements and modifications necessary to make the device work in particular network environments.

FIG. 3 is an exploded view showing some of the typical components found in the assembly of the handheld electronic device 300. The construction of the device benefits from various manufacturing simplifications. The internal components are constructed on a single PCB (printed circuit board) 102. The keyboard 332 is constructed from a single piece of material, and in a preferred embodiment is made from plastic. The keyboard 332 sits over dome switches (not shown) located on the PCB 102 in a preferred embodiment. One switch is provided for every key on the keyboard in the preferred embodiment, but in other embodiments more than one switch or less than one switch per key are possible configurations. The support frame 101 holds the keyboard 332 and cursor navigation assembly 328 in place above the PCB 102. The support frame 101 also provides an attachment point for the display (not shown). A lens 103 can cover the display to prevent damage. When assembled, the support frame 101 and the PCB 102 are fixably attached to each other and the display (322) is positioned between the PCB 102 and support frame 101.

A serial port (preferably a Universal Serial Bus port) 330 and an earphone jack 140 can be fixably attached to the PCB 102 and further held in place by right side element 105. Buttons 130, 131, 132, 133 can be attached to switches (not shown), which are connected to the PCB 102.

Final assembly can involve placing the top piece 107 and bottom piece 108 in contact with support frame 101. Furthermore, the assembly can interconnect right side element 105 and left side element 106 with the support frame 101, PCB 102, and lens 103. These side elements 105, 106 can provide additional protection and strength to the support structure of the device 300. In an embodiment, backplate 104 can be removably attached to the other elements of the device. As it may be appreciated by those having skill in the art, handheld electronic device 300 may be differently configured than the embodiment illustrated in FIG. 3 such that components and methods of assembly therefor, can vary The block diagram of FIG. 4, represents an embodiment of handheld electronic device 300 interacting in a communications network 319, and illustrates the use of a microprocessor 338 to control operation of the device 300. In FIG. 4, communication subsystem 311 performs all communication transmission and reception with wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is capable of performing operating system functions and can enable execution of software applications on the communication device 300.

The above described auxiliary I/O subsystem 328 can take a variety of different subsystems including the above described cursor navigation assembly 328. As previously mentioned, the cursor navigation assembly (also known as a navigation tool) 328 is an ergonomic cursor navigation controller. Other auxiliary I/O devices can include external display devices and externally connected keyboards (not shown). While the above examples have been provided in relation to the auxiliary I/O subsystem, other subsystems capable of providing input or receiving output from the handheld electronic device 300 are considered within the scope of this disclosure.

In a preferred embodiment, the handheld electronic device 300 is designed to wirelessly connect with a communication network 319. Some communication networks that the handheld electronic device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, a flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network.

For the systems listed above, the communication device 300 must be properly enabled to transmit and receive signals from the communication network 319. Other systems may not require such identifying information. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different handheld electronic devices 300. Handheld electronic device 300 can be configured to operate some features without a SIM/RUIM card, but it may not be able to communicate with the network 319. In some locations, the handheld electronic device 300 can be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled handheld electronic communications device 300, two-way communication between the handheld electronic device 300 and communication network 319 is possible.

If the handheld electronic device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae 316, 318 in another preferred embodiment are combined into a single antenna (not shown). As one skilled in the art would appreciate, the antenna or antennae 316, 318 in another embodiment are externally mounted on the device 300.

When equipped for two-way communication, the handheld electronic device 300 features a communication subsystem 311. As is well known in the art, this communication subsystem 311 is modified so that it can support the operational needs of the device 300. The subsystem 311 includes a transmitter 314 and receiver 312 including the associated antenna or antennae 316, 318 as described above, local oscillators (LOs) 313, and a processing module 320 which in a preferred embodiment is a digital signal processor (DSP) 320.

A signal received by the handheld electronic device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the communication device 300 to properly transmit the email message over a given communication network 319.

Furthermore, the email message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the email message. Once the email message is generated, the user may execute a send command which directs the email message from the communication device 300 to the communication network 319. In an exemplary embodiment, a keyboard 332, and preferably an alphanumeric keyboard is used to compose the email message. In a preferred embodiment, an auxiliary I/O device 328 is used in addition to the keyboard 332.

While the above has been described in relation to email messages, one skilled in the art can modify the procedures to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding handheld electronic devices 300 and wireless handheld communication devices 300 as well as the communication networks within which they cooperate. It should be appreciated, however, that a focus of the present disclosure is the enablement of an angular keyboard for a handheld electronic device.

What is claimed is:

1. A wireless handheld mobile communication device comprising:
   a housing configured to be cradled in a palm of a user's hand and having a display located in a top portion thereof for displaying information to the user and a keyboard exposed for user actuation below said display;
   said device having a vertical centerline and a length measured between a top and bottom edge of the device and a width measured between right and left lateral side edges of the device, said length of the device being greater than said width of the device;
   said keyboard being defined by right, left, upper and lower boundaries and said keyboard comprising a right-hand keyfield composed of a plurality of keys located on a right-hand side of said vertical centerline of the device and a left-hand keyfield composed of a plurality of keys located on a left-hand side of said vertical centerline of the device;
   each key of said plurality of keys located on the right-hand side of said vertical centerline having a longitudinal axis and said longitudinal axis being oriented at a left-to-right inclined angle from said vertical centerline;
   each key of said plurality of keys located on the left-hand side of said vertical centerline having a longitudinal axis and said longitudinal axis being oriented at a right-to-left inclined angle from said vertical centerline; and
   said left boundary of said keyboard being located adjacent said left lateral side edge of the device and said right boundary of said keyboard being located adjacent said right lateral side edge of the device so that said keyboard spans a substantial entirety of the width of the device.

2. The device as recited in claim 1, wherein, when said device is cradled in a right hand of the user, the longitudinal axis of each key of said plurality of keys located on the right-hand side of said vertical centerline is oriented to be substantially parallel with a widthwise axis of the user's right-hand thumb when the user thumb types upon said keyboard using the right-hand thumb.

3. The device as recited in claim 1, wherein, when said device is cradled in a right hand of the user, the longitudinal axis of each key of said plurality of keys located on the left-hand side of said vertical centerline is oriented to be substantially parallel with a length wise axis of the user's right-hand thumb when the user thumb types upon said keyboard using the right-hand thumb.

4. The device as recited in claim 1, wherein, when said device is cradled in a left hand of the user, the longitudinal axis of each key of said plurality of keys located on the left-hand side of said vertical centerline is oriented to be substantially parallel with a widthwise axis of the user's left-hand thumb when the user thumb types upon said keyboard using the left-hand thumb.

5. The device as recited in claim 1, wherein, when said device is cradled in a left hand of the user, the longitudinal axis of each key of said plurality of keys located on the right-hand side of said vertical centerline is oriented to be substantially parallel with a length wise axis of the user's left-hand thumb when the user thumb types upon said keyboard using the left-hand thumb.

6. The device as recited in claim 1, wherein at least one row of keys extending between said right and left lateral side edges of the device are arranged in an adjoining series with minimal clearance space between adjacent keys sufficient to accommodate relative movement between said adjacent keys.

7. The device as recited in claim 6, wherein said adjacent keys are substantially contiguously arranged.

8. The device as recited in claim 1, wherein said plurality of keys are arranged in adjoining rows and columns with minimal clearance space between adjacent keys so that the area defined by said right, left, upper and lower boundaries is substantially key-filled.

9. The device as recited in claim 8, wherein said adjacent keys are substantially contiguously arranged.

10. The device as recited in claim 1, wherein at least one key in said right-hand keyfield is trapezoidal shaped and at least one key in said left-hand keyfield is trapezoidal shaped.

11. The device as recited in claim 1, wherein at least one key in said right-hand keyfield is isosceles trapezoidal shaped and at least one key in said left-hand keyfield is isosceles trapezoidal shaped.

12. The device as recited in claim 1, wherein at least one key in said right-hand keyfield is non-rectangular, parallelogram shaped and at least one key in said left-hand keyfield is non-rectangular, parallelogram shaped.

13. The device as recited in claim 1, wherein at least one key from said right-hand keyfield that is adjacent said vertical centerline adjoins a key from said left-hand keyfield that is adjacent said vertical centerline and together form a downward pointing arrow.

14. The device as recited in claim 13, further comprising an auxiliary input device that controls a cursor on said display is at least partially located within a space partially bounded by said downward pointing arrow.

15. The device as recited in claim 13, wherein the auxiliary input device is one of a trackball, navigation key, navigation wheel, cursor keys, track wheel, roller barrel, touch pad, or joystick.

16. The device as recited in claim 13, further comprising an auxiliary input device that controls menu scrolling on said display is at least partially located within a space partially bounded by said downward pointing arrow.

17. The device as recited in claim 1, wherein said right-hand keyfield and said left-hand keyfield is flanked by an upper row of function keys.

18. The device as recited in claim 17, wherein said upper row of function keys is generally upwardly convexly shaped.

19. The device as recited in claim 17, wherein said upper row of function keys is generally upwardly concavely shaped.

20. The device as recited in claim 1, wherein said right-hand keyfield and said left-hand keyfield is flanked by a lower row of function keys.

21. The device as recited in claim 20, wherein said lower row of function keys is generally upwardly convexly shaped.

22. The device as recited in claim 20, wherein said lower row of function keys is generally upwardly concavely shaped.

23. The device as recited in claim 1, wherein said width of said device measures approximately three inches thereby facilitating user palm-cradling of the device.

24. The device as recited in claim 1, wherein said width of said device is greater than two inches and less than three and one-half inches thereby facilitating user palm-cradling of the device.

25. The device as recited in claim 1, wherein a top surface of at least one of said plurality of keys is substantially cylindrical in shape.

26. The device as recited in claim 1, wherein said device is capable of wireless voice communication and wireless data communication.

27. The device as recited in claim 1, wherein said plurality of keys have letter indicia arranged in a QWERTY format associated therewith.

28. The device as recited in claim 1, further comprising an auxiliary input device located substantially between said display and said keyboard, said auxiliary input device being a trackball arrangement.

29. The device as recited in claim 1, further comprising an auxiliary input device located substantially between said display and said keyboard, said auxiliary input device being a navigation key.

30. The device as recited in claim 1, further comprising an auxiliary input device located substantially between said display and said keyboard, said auxiliary input device being a navigation wheel.

31. The device as recited in claim 1, further comprising an auxiliary input device located substantially between said display and said keyboard, said auxiliary input device being cursor keys.

32. The device as recited in claim 1, further comprising an auxiliary input device located substantially between said display and said keyboard, said auxiliary input device being a track wheel.

33. The device as recited in claim 1, further comprising an auxiliary input device located substantially between said display and said keyboard, said auxiliary input device being a roller barrel.

34. The device as recited in claim 1, further comprising an auxiliary input device located substantially between said display and said keyboard, said auxiliary input device being a touch pad.

35. The device as recited in claim 1, further comprising an auxiliary input device located substantially between said display and said keyboard, said auxiliary input device being a joystick.

* * * * *